Patented July 2, 1940

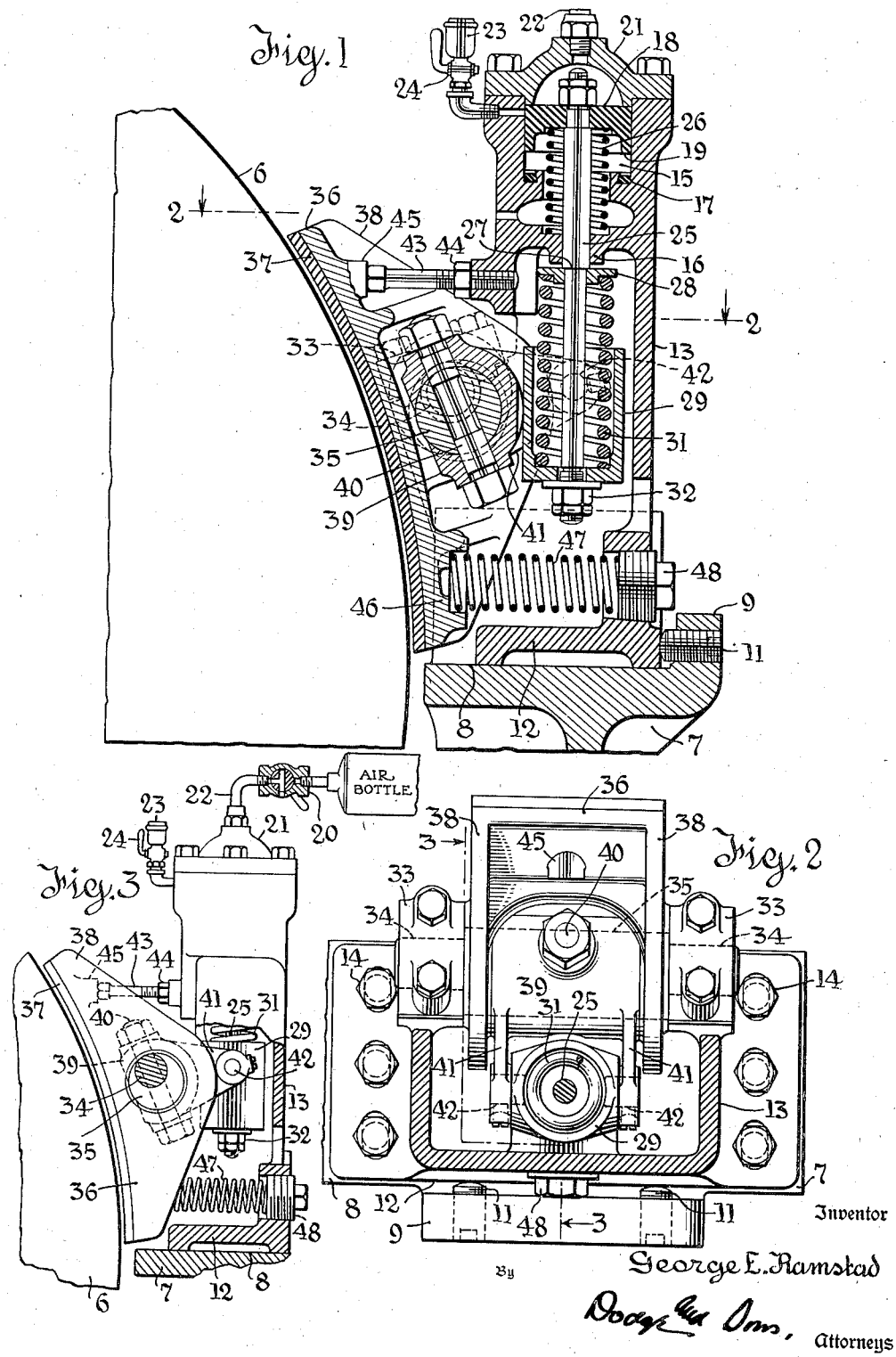

2,206,617

UNITED STATES PATENT OFFICE 2,206,617

MACHINE BRAKE

George E. Ramstad, Milwaukee, Wis., assignor to Nordberg Manufacturing Company, Milwaukee, Wis., a corporation of Wisconsin Application February 15, 1939, Serial No. 256,585

7 Claims. (Cl. 188—151)

This invention relates to machine brakes, and particularly to a power brake for use with marine engines of the Diesel type.

Maneuvering gears for Diesel and like engines may be of the two-controller type or the single controller type, but regardless of type there is a setting in which reversal of the engine valve gear must take place and in which fuel and starting air are both cut off. Thus there is what may be called a "stop range" in which reversal occurs. It is considered advisable to brake the engine in the stop range, so that the valve gear may be reversed while the engine is at rest, and so that the starting mechanism will not be deranged or overloaded by coming into action while the engine is in motion.

The most convenient scheme is to use an air brake operated by starting air. Since air stored in the usual starting air bottle is under rather high pressure and since the pressure under which the air is stored varies between rather wide limits, there are serious practical difficulties. For example, in one commercial engine the starting air is stored under a maximum pressure of 400 lbs. per square inch, but the minimum pressure at which the starting gear is operative is as low as 170 lbs. per square inch. This variation of pressure would produce wide variations of braking force unless special provision is made to prevent that effect. Also the tendency toward cylinder leakage and the importance of economizing in the use of air introduce other requirements.

To meet the problem, use is made of a piston which is relatively small and which is positively limited as to its travel, the stroke being made as short as is practicable. The piston is not provided with packing rings but is arranged to seat against a gasket at its limit of motion in a brake applying direction.

To make sure that the piston always moves full stroke, an initially stressed load limiting spring is interposed between the piston and the brake shoe. The stress in this spring is such that it will be overpowered by the minimum available operating pressure.

To guide the brake shoe, sustain it against the braking reaction, and ensure such precise control of its motion that a very short travel of the brake shoe is permissible, use is made of an eccentric on which the brake shoe is directly mounted and by which it is sustained against the braking reaction. This eccentric is part of the force multiplying mechanism. An adjustable shoe stop is provided which functions when the brake is released to position the brake shoe quite accurately without, however, limiting the self aligning tendency of the brake shoe during applications.

The device is strong, simple and compact, and is readily applicable to a large variety of engines. While the brake might be applied to any drum rotating with the engine shaft, it is convenient to brake the fly wheel.

A preferred embodiment of the invention will now be described by reference to the accompanying drawing, in which:

Fig. 1 is a vertical axial section.

Fig. 2 is a section on the line 2—2 of Fig. 1.

Fig. 3 is a view partly in elevation and partly in section on the line 3—3 of Fig. 2, this figure being drawn on a relatively smaller scale than Fig. 2. In this view the source of braking air is indicated.

In the drawing, 6 represents the rim of the engine fly wheel and 7 a portion of the engine frame formed with a seat 8 in a plane so located that adjustment of the braking unit thereon will move the brake shoe in a line approximately radial to the axis of the fly wheel. At the outer margin of the seat 8 is a lug 9 in which are threaded two adjusting thrust screws 11. These screws react against the base plate 12 formed integrally with the housing 13 of the brake structure. The plate 12 is adjustably clamped to seat 8 by bolts 14 which pass through parallel slots in plate 12.

As will be apparent from an inspection of Figure 1, this permits adjustment of the entire braking structure toward and from the fly wheel and determines not only the clearance between the brake shoe and the wheel when the brake is released, but also the maximum intensity with which the brake is applied.

The housing 13 carries near its upper end, a cylinder 15 and below that cylinder a piston rod guide 16. The cylinder 15 is grooved at its lower end to receive an annular gasket 17 against which the piston 18 seals, the piston being prvoided with a peripheral flange or rim 19 for this purpose. The upper end of the cylinder 15 is closed by a head or cover 21 to which is connected the pipe 22 leading from the brake valve 20 here shown as a three-way cock controlling the admission and exhaust of air to and from the space above the piston 18. The starting air bottle is indicated by a legend in Fig. 3.

A lubricant cup 23 with normally closed cock 24 is provided to permit occasional lubrication of the piston without risk of the leakage of air through the lubricator. The piston 18 is rigidly connected to a rod 25 which works in the guide 16. A relatively light coil compression spring 26 reacts between the piston and the upper wall of the guide 16 and urges the piston upward toward its normal or brake releasing position.

The rod 25 is shouldered as indicated at 27, the shoulder being so located that it is below the guide 16 when the piston 18 is in its uppermost position, as shown in Figure 1.

A spring seat 28 is sustained by the shoulder 27, and between this spring seat and a second cup-shaped spring seat 29 a heavy coiled compression spring 31 is held under partial compression by the nut and washer assembly generally illustrated at 32. The components 32 as clearly shown in Figure 1, comprise an adjusting nut with thrust washer and a check nut to maintain the adjustment. The initial stress on the spring 31 is determined in relation to the maximum braking pressure which is to be developed, as will be explained later.

The portion of the housing 13 below the guide 16 has a general channel-shaped configuration as indicated in section in Figure 2. Mounted on the arms of this channel section are two aligned bearing boxes 33 in which are journaled the small end portions 34 of the brake actuating shaft. This shaft has a middle portion 35 which is cylindrical and larger than the end portions 34 but eccentric with reference to the end portions 34, as is best shown in Figure 3.

The brake shoe, generally indicated at 36, has a facing 37 which serves as the actual friction surface to engage the rim 6 of the fly wheel. Shoe 36 has on its back two parallel spaced flanges 38, which flanges are swiveled on the end portions of the eccentric part 35 of the brake applying shaft.

Between the flanges 38 is mounted the hub 39 of a forked lever whose two arms 41 straddle the cup-like spring seat 29 and are pinned thereto as indicated at 42. The hub 39 is pinned to the eccentric portion 35 of the shaft by a cross bolt 40. If the piston 18 be subjected to pressure on its upper face, it moves full stroke and seats upon gasket 17, so that leakage of air is absolutely precluded in the applied position of the brake.

Downward motion of the piston 18 entails downward motion of the spring seat 29 and this obviously entails rotation of the eccentric portion 35 around the end portions 34 of the brake applying shaft. Thus the brake shoe 36 is forced against the fly wheel 6.

The stroke of the piston 18 is so dimensioned as to be more than sufficient to shift the shoe 36 to applied position, and the excess motion is permitted by compression of the spring 31. Thus this spring not only permits full travel of the piston 18 to its sealing position, but also serves to limit the maximum force with which the brake shoe is applied. It follows that by adjusting the nut assembly 32 and by shifting the base 12 toward and from the fly wheel, the intensity of brake application may be so adjusted as to meet the requirements of the particular installation. The adjustment of the base also permits compensation for wear.

It will be appreciated, of course, that the area of the piston 18 is so chosen with reference to the minimum available air pressure for braking purposes that under such minimum pressure the piston is capable of overpowering the spring 31 and the spring 26. Otherwise it could not move full stroke. If this condition is met, the brake will be applied with uniform force, irrespective of the variations of supply pressure, all of which will be above the minimum just specified.

Thus the invention contemplates not merely a limited braking effect but a uniform braking effect, irrespective of variations of air pressure used in braking.

It should also be observed that when the piston 18 moves upward the spring seat 29 engages the nut assembly 32 so that the brake is withdrawn from contact with the wheel 6.

In order to hold the shoe properly spaced from the fly wheel 6 when the brake is released, use is made of an adjustable stud 43 with a lock nut 44. The stud 43 serves as a stop and engages a boss 45 formed near the upper end of the brake shoe 36.

Near the lower end of the brake shoe is a spring seat 46. A coil compression spring 47 reacts between this seat and a removable plug 48. When the brake is applied the stud 43 is ineffective, but upon releasing motion of the brake the spring 47 which is comparatively light, holds the brake shoe so that the boss 45 engages the stud 43. Thus, although the brake shoe retreats only a relatively short distance, it is retained in a position in which it entirely clears the wheel.

It will be observed that when the brake is applied, the cup 29 moves clear of the nut assembly 32 and does not then have a close fit on the rod 25. Consequently, the cup permits compensation for the slightly arcuate path of the pins 42 which connect the cup with the yoke.

The device is simple, is easy to adjust, is protected against leakage when the brake is applied, and because of its small bore and short stroke, consumes relatively little air to effect a brake application.

While the invention has been described in considerable detail, modifications within the scope of the claims are obviously possible.

What is claimed is:

1. A braking unit for engines and the like having an element to be frictionally braked which element is rotatable about a fixed axis, comprising in combination, a supporting frame element; a brake cylinder carried thereby; a piston reciprocable in said cylinder; a shaft journaled in said frame element and having an eccentric portion; a brake shoe journaled on the eccentric portion of said shaft; and a yielding connection between said piston and said shaft whereby the piston rotates the shaft, said yielding connection permitting the piston to move full stroke and serving to limit to a fixed uniform value the force with which the brake shoe is urged against the braked element.

2. A braking unit for engines and the like having an element to be frictionally braked which element is rotatable about a fixed axis, comprising in combination, a supporting frame element; a brake cylinder carried thereby; a piston reciprocable in said cylinder; a gasket against which the piston seals at the end of its working stroke; a shaft journaled in said frame element and having an eccentric portion; a brake shoe journaled on the eccentric portion of said shaft; and a yielding connection between said piston and said shaft whereby the piston rotates the shaft, said yielding connection permitting the piston to move full stroke and serving to limit to a fixed uniform value the force with which the brake shoe is urged again the braked element.

3. A braking unit for engines and the like having an element to be frictionally braked which element is rotatable about a fixed axis, comprising in combination, a supporting frame element; a brake cylinder carried thereby; a piston reciprocable in said cylinder; a shaft journaled in said frame element and having an eccentric portion; a brake shoe journaled on the eccentric portion of said shaft; a yielding connection between said piston and said shaft whereby the piston rotates the shaft, said yielding connection permitting the piston to move full stroke and serving to limit to a fixed uniform value the force with which the brake shoe is urged against the braked element; and means for maintaining an initial stress within said yielding connection.

4. A braking unit for engines and the like having an element to be frictionally braked which element in rotatable about a fixed axis, comprising in combination, a supporting frame element; a brake cylinder carried thereby; a piston reciprocable in said cylinder; a shaft journaled in said frame element and having an eccentric portion; a brake shoe journaled on the eccentric portion of said shaft; a yielding connection between said piston and said shaft whereby the piston rotates the shaft, said yielding connection permitting the piston to move full stroke and serving to limit to a fixed uniform value the force with which the brake shoe is urged against the braked element; and means for adjusting said frame element toward and away from the element to be braked.

5. A braking unit for engines and the like having an element to be frictionally braked which element is rotatable about a fixed axis, comprising in combination, a supporting frame element; a brake cylinder carried thereby; a piston reciprocable in said cylinder; a shaft journaled in said frame element and having an eccentric portion; a brake shoe journaled on the eccentric portion of said shaft; a yielding connection between said piston and said shaft whereby the piston rotates the shaft, said yielding connection permitting the piston to move full stroke and serving to limit to a fixed uniform value the force with which the brake shoe is urged against the braked element; adjustable means for maintaining an initial stress within said yielding member; and means for adjusting said frame element toward and away from the element to be braked.

6. A braking unit for engines and the like having an element to be frictionally braked, comprising in combination, a supporting frame element; a brake cylinder carried thereby; a piston reciprocable in said cyllinder; means for limiting the working stroke of said piston; a source of pressure fluid subject to substantial variations of pressure; a brake valve of the admission and exhaust type controlling pressure in the brake cylinder; a brake shoe; means for supporting and guiding the brake shoe in motions toward and from the braked element; and a motion transmitting connection between said piston and said shoe, said connection including a yielding element confined under an initial stress such that the yielding element will be overpowered by the piston when the latter is subjected to the minimum fluid pressure available in said source.

7. A braking unit for engines and the like having an element to be frictionally braked, comprising in combination, a supporting frame element; a brake cylinder carried thereby; a piston reciprocable in said cylinder; a gasket against which said piston seals at the limit of its working stroke; a source a pressure fluid subject to substantial variations of pressure; a brake valve of the admission and exhaust type controlling pressure in the brake cylinder; a brake shoe; means for supporting and guiding the brake shoe in motions toward and from the braked element; and a motion transmitting connection between said piston and said shoe, said connection including a yielding element confined under an initial stress and subject to a range of displacement such that the piston will move full stroke and seal against the gasket when subjected to the minimum fluid pressure available in said source, whereby cylinder leakage is prevented and the brake is caused to be applied with uniform force irrespective of variations of fluid pressure.

GEORGE E. RAMSTAD.

CERTIFICATE OF CORRECTION.

Patent No. 2,206,617. July 2, 1940.

GEORGE E. RAMSTAD.

It is hereby certified that error appears in the printed specification of the above numbered patent requiring correction as follows: Page 1, second column, line 44, for "prvoided" read --provided--; page 3, first column, line 21, claim 4, for "element in" read --element is--; second column, line 31, claim 7, for "a source a" read --a source of--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.